United States Patent
Ota

(10) Patent No.: US 11,102,423 B2
(45) Date of Patent: Aug. 24, 2021

(54) IMAGE PICKUP APPARATUS THAT PERFORMS FLICKER DETECTION, CONTROL METHOD FOR IMAGE PICKUP APPARATUS, AND STORAGE MEDIUM

(71) Applicant: CANON KABUSHIKI KAISHA, Tokyo (JP)

(72) Inventor: Kohei Ota, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/666,535

(22) Filed: Oct. 29, 2019

(65) Prior Publication Data

US 2020/0137291 A1 Apr. 30, 2020

(30) Foreign Application Priority Data

Oct. 31, 2018 (JP) .............................. JP2018-205620

(51) Int. Cl.
*H04N 5/235* (2006.01)

(52) U.S. Cl.
CPC .......... *H04N 5/2357* (2013.01); *H04N 5/2353* (2013.01)

(58) Field of Classification Search
CPC ........ G03B 15/00; G03B 15/03; G03B 15/05; G03B 7/093; H04N 5/2357; H04N 5/235; H04N 5/232; H04N 5/23229; H04N 5/2351; H04N 5/2353; H04N 5/2354; H04N 5/243; H04N 5/3532; H04N 5/357; H04N 5/217; H04N 5/225; H04N 5/23218; H04N 5/23232; H04N 5/23245; H04N 5/232945; H04N 5/2352; H04N 7/0127

See application file for complete search history.

(56) References Cited

U.S. PATENT DOCUMENTS

| | | | | |
|---|---|---|---|---|
| 7,589,763 | B2 * | 9/2009 | Ono | ...................... H04N 5/2353 348/226.1 |
| 9,794,491 | B2 | 10/2017 | Nakagawara | |
| 10,057,501 | B2 * | 8/2018 | Onodera | .............. H04N 5/3532 |

(Continued)

FOREIGN PATENT DOCUMENTS

| CN | 102387321 A | 3/2012 |
|---|---|---|
| CN | 103250418 A | 8/2013 |

(Continued)

OTHER PUBLICATIONS

Office Action issued in Chinese Appln. No. 201911044125.3 dated May 7, 2021. English translation provided.

*Primary Examiner* — Chiawei Chen
(74) *Attorney, Agent, or Firm* — Rossi, Kimms & McDowell LLP

(57) ABSTRACT

An image pickup apparatus includes an image pickup device that picks up a subject by driving by a rolling shutter method, a memory that stores a set of instructions and at least one processor that executes the instructions to divide, when driving the image pickup device at a second frame rate lower than a first frame rate, a plurality pieces of image data successively acquired by the image pickup device at the second frame rate into predetermined areas to acquire data of divided areas, and perform flicker detection using a predetermined number of pieces of the data of the divided areas successive for a plurality of frames.

13 Claims, 8 Drawing Sheets

(56) References Cited

U.S. PATENT DOCUMENTS

| | | | | |
|---|---|---|---|---|
| 2003/0030744 A1* | 2/2003 | Baer | ............... | H04N 5/217 |
| | | | | 348/370 |
| 2008/0101721 A1 | 5/2008 | Mori | | |
| 2010/0295765 A1* | 11/2010 | Hsiao | ............... | G09G 3/3648 |
| | | | | 345/98 |
| 2011/0205394 A1* | 8/2011 | Fuchigami | ............ | H04N 5/243 |
| | | | | 348/226.1 |
| 2012/0154629 A1* | 6/2012 | Horiuchi | ............ | H04N 7/0127 |
| | | | | 348/226.1 |
| 2017/0343882 A1* | 11/2017 | Furuta | ............ | H04N 5/2357 |
| 2017/0366731 A1* | 12/2017 | Onodera | ............ | H04N 5/3532 |
| 2019/0289191 A1* | 9/2019 | Noda | ............ | H04N 5/2353 |
| 2020/0053273 A1* | 2/2020 | Kim | ............ | H04N 5/2357 |
| 2020/0177785 A1* | 6/2020 | Koiso | ............ | H04N 5/232 |

FOREIGN PATENT DOCUMENTS

| | | |
|---|---|---|
| CN | 105915807 A | 8/2016 |
| CN | 107409181 A | 11/2017 |
| CN | 107431769 A | 12/2017 |
| JP | 2012120132 A | 6/2012 |
| JP | 2014220764 A | 11/2014 |

* cited by examiner

FIG. 2
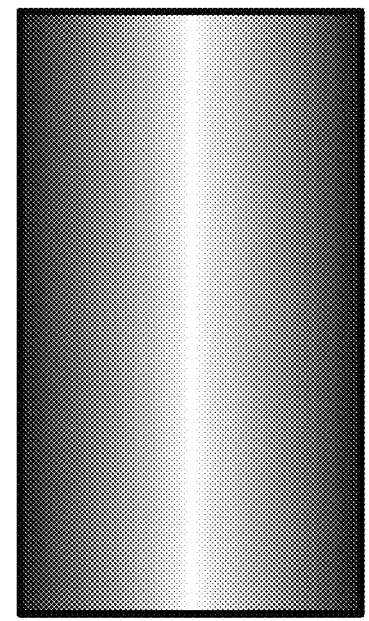
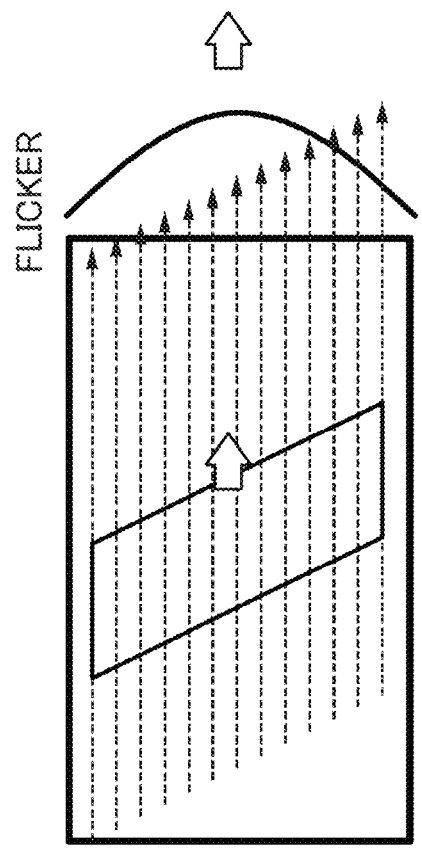

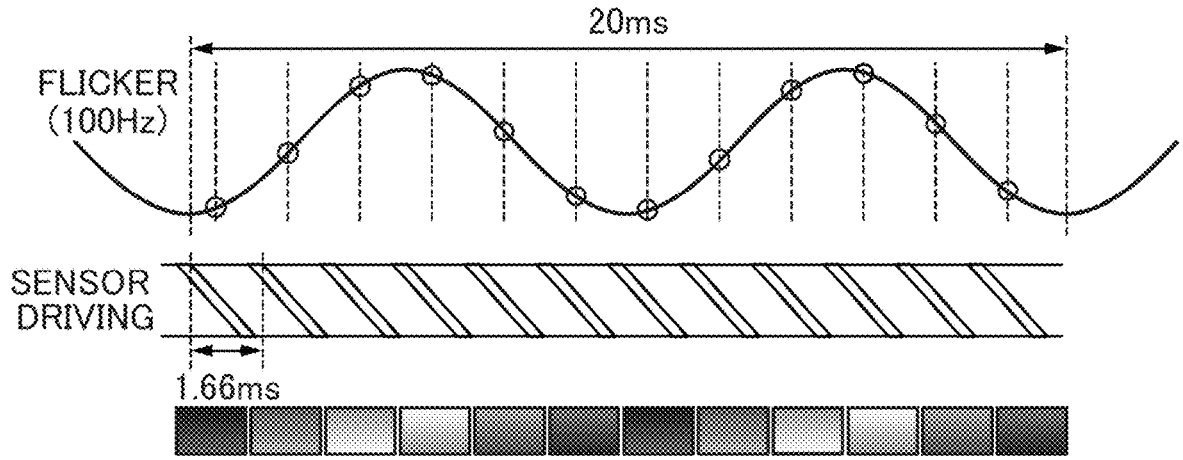
FIG. 3A ACCUMULATION SETTING EXAMPLE IN CASE OTHER THAN CASE OF LOW LUMINANCE (FRAME RATE: 600fps MAXIMUM 1.66 ms ACCUMULATION)
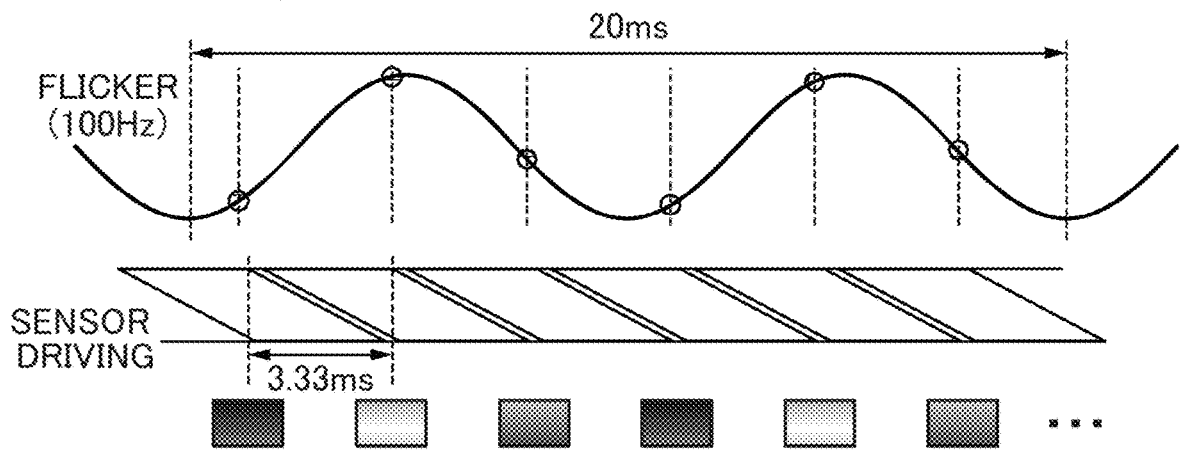
FIG. 3B ACCUMULATION SETTING EXAMPLE IN CASE OF LOW LUMINANCE (FRAME RATE: 300 fps MAXIMUM 3.33 ms ACCUMULATION)
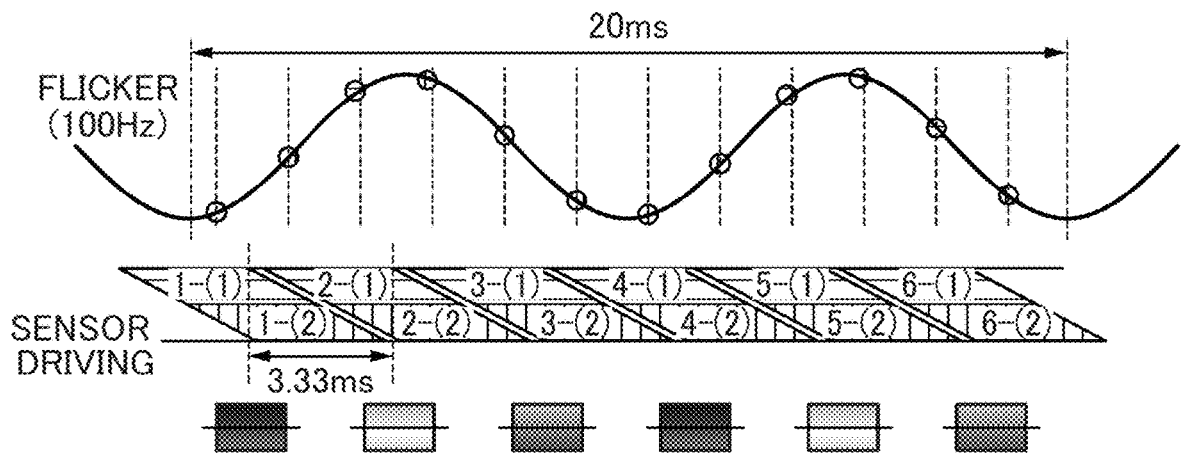
FIG. 3C ACCUMULATION SETTING EXAMPLE IN CASE OF LOW LUMINANCE (FRAME RATE: 300 fps MAXIMUM 3.33 ms ACCUMULATION)

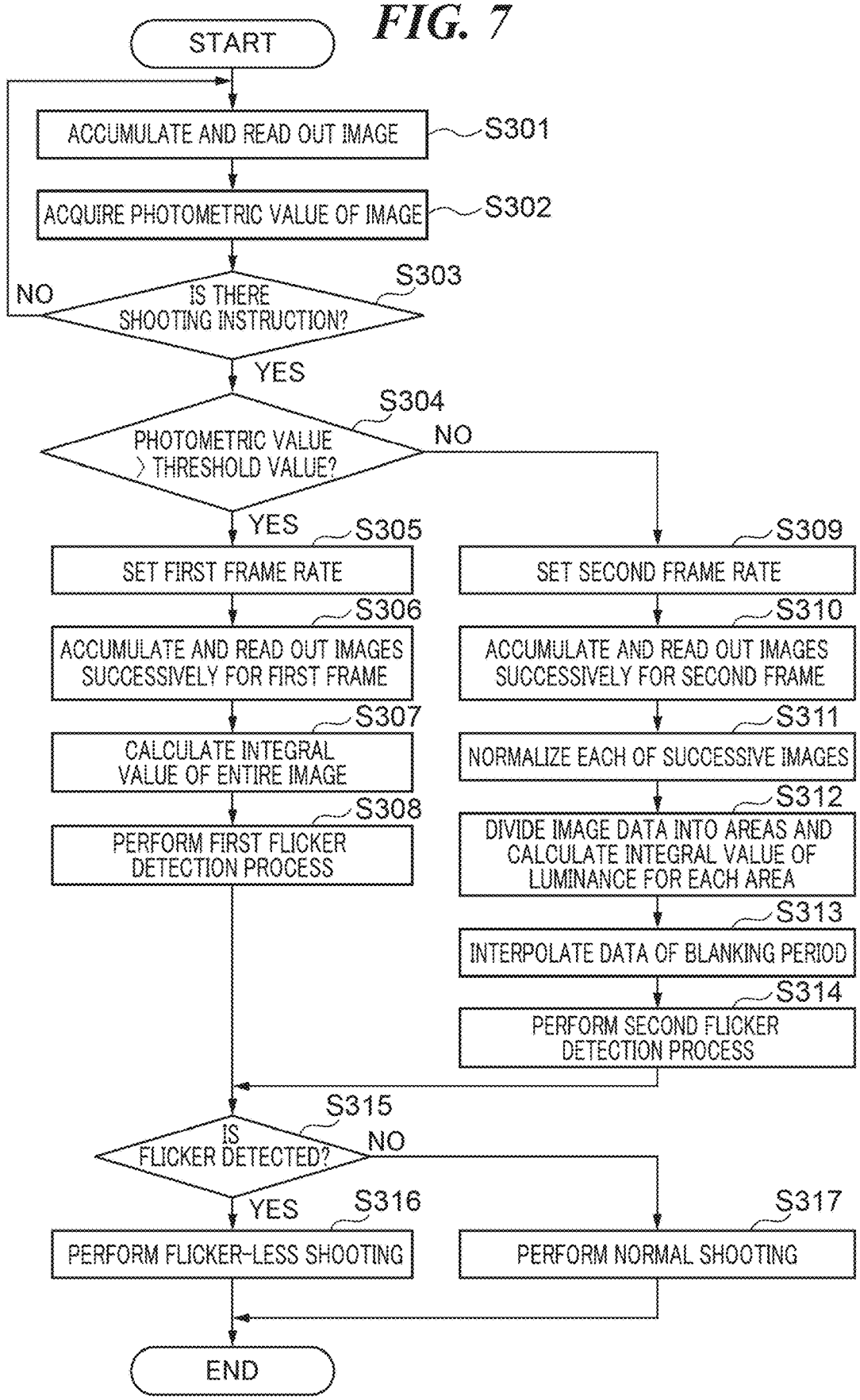

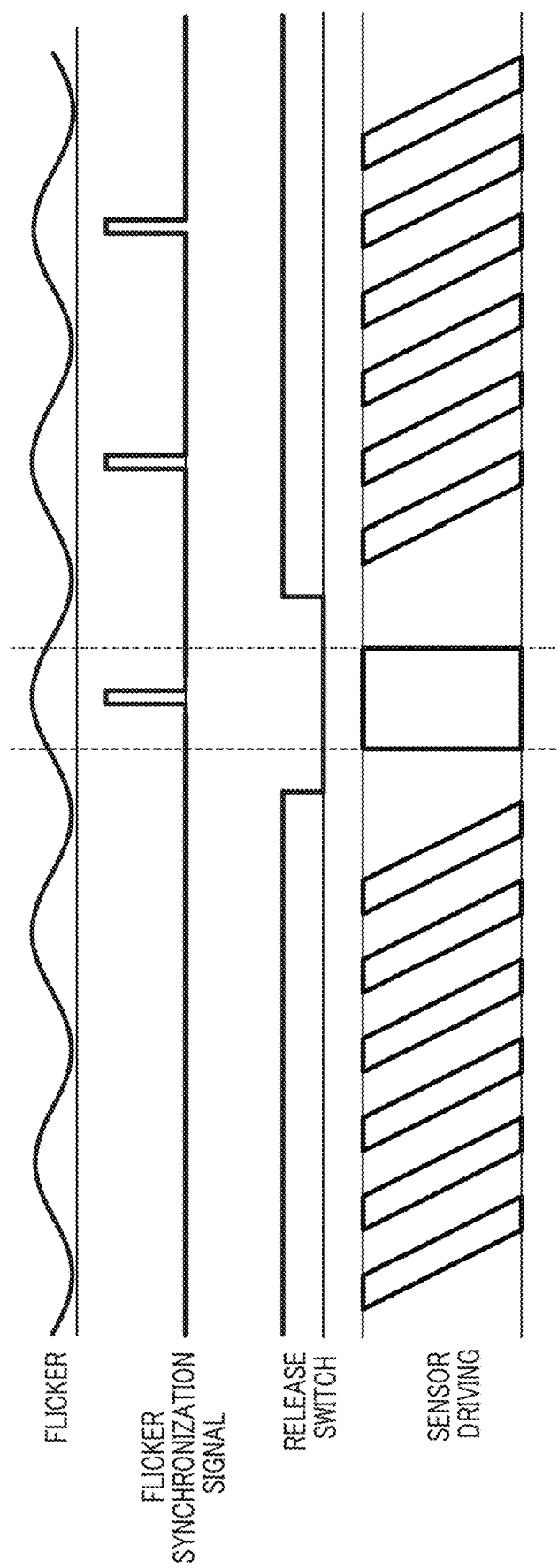

IMAGE PICKUP APPARATUS THAT PERFORMS FLICKER DETECTION, CONTROL METHOD FOR IMAGE PICKUP APPARATUS, AND STORAGE MEDIUM

BACKGROUND OF THE INVENTION

Field of the Invention

The present invention relates to an image pickup apparatus that performs flicker detection, a control method for an image pickup apparatus, and a storage medium.

Description of the Related Art

In recent digital cameras, it has become possible to release high-speed shutters even under artificial light sources. However, in high-speed shutter shooting with a slit exposure method under a flicker light source, the brightness of the light source changes while the shutter is moving, and unevenness of screen exposure or color may occur for each frame or even in a frame. As related technologies, Japanese Laid-Open Patent Publication (kokai) No. 2014-220764 and Japanese Laid-Open Patent Publication (kokai) No. 2012-120132 have been proposed.

The technology of Japanese Laid-Open Patent Publication (kokai) No. 2014-220764 calculates the timing of the peak of the light amount of the flicker light source between frames of successive shootings even when there is some fluctuation of the commercial power supply frequency, and performs each shooting in accordance with the calculated peak timing. The technology of Japanese Laid-Open Patent Publication (kokai) No. 2012-120132 calculates the luminance evaluation value of each of the selected partial areas in the frame from a plurality of frame image signals, and detects the flicker frequency of the light source present the subject field based on the change of the calculated luminance evaluation value.

As a method for detecting flicker, a method is known in which sampling is performed at a frequency several times or more the flicker cycle. When this method is adopted, it is necessary to secure the charge accumulation time in order to obtain image data having sufficient brightness under conditions such as when a low-luminance subject is picked up. For this reason, it is necessary to reduce the frame rate at which the image pickup apparatus picks up an image. When the frame rate is reduced, the number of samplings is reduced, which may reduce the flicker detection accuracy. When the flicker detection accuracy decreases, flicker-less shooting may be performed at a timing shifted from the actual flicker peak timing.

SUMMARY OF THE INVENTION

The present invention provides an image pickup apparatus capable of improving the accuracy of flicker detection regardless of the luminance of a subject, and a control method and program of the image pickup apparatus.

Accordingly, the present invention provides an image pickup apparatus comprising an image pickup device that picks up a subject by driving by a rolling shutter method, a memory that stores a set of instructions, and at least one processor that executes the instructions to divide, when driving the image pickup device at a second frame rate lower than a first frame rate, a plurality of pieces of image data successively acquired by the image pickup device at the second frame rate into predetermined areas to acquire data of divided areas, and perform flicker detection using a predetermined number of pieces of the data of the divided areas successive for a plurality of frames.

According to the present invention, the accuracy of flicker detection can be improved regardless of the luminance of a subject.

Further features of the present invention will become apparent from the following description of exemplary embodiments (with reference to the attached drawings).

BRIEF DESCRIPTION OF THE DRAWINGS

FIG. 2 is a diagram showing charge transfer by a rolling shutter method.

FIG. 3A is a diagram showing sensor driving and flicker when the luminance of a subject is not low, and FIGS. 3B and 3C are diagrams showing sensor driving and flicker when the luminance of the subject is low.

FIG. 7 is a flowchart showing a process flow of the embodiment.

FIG. 8 is a diagram showing sensor driving before and after main shooting when a sensor is driven for flicker detection by a global shutter method.

DESCRIPTION OF THE EMBODIMENTS

Figure 1:
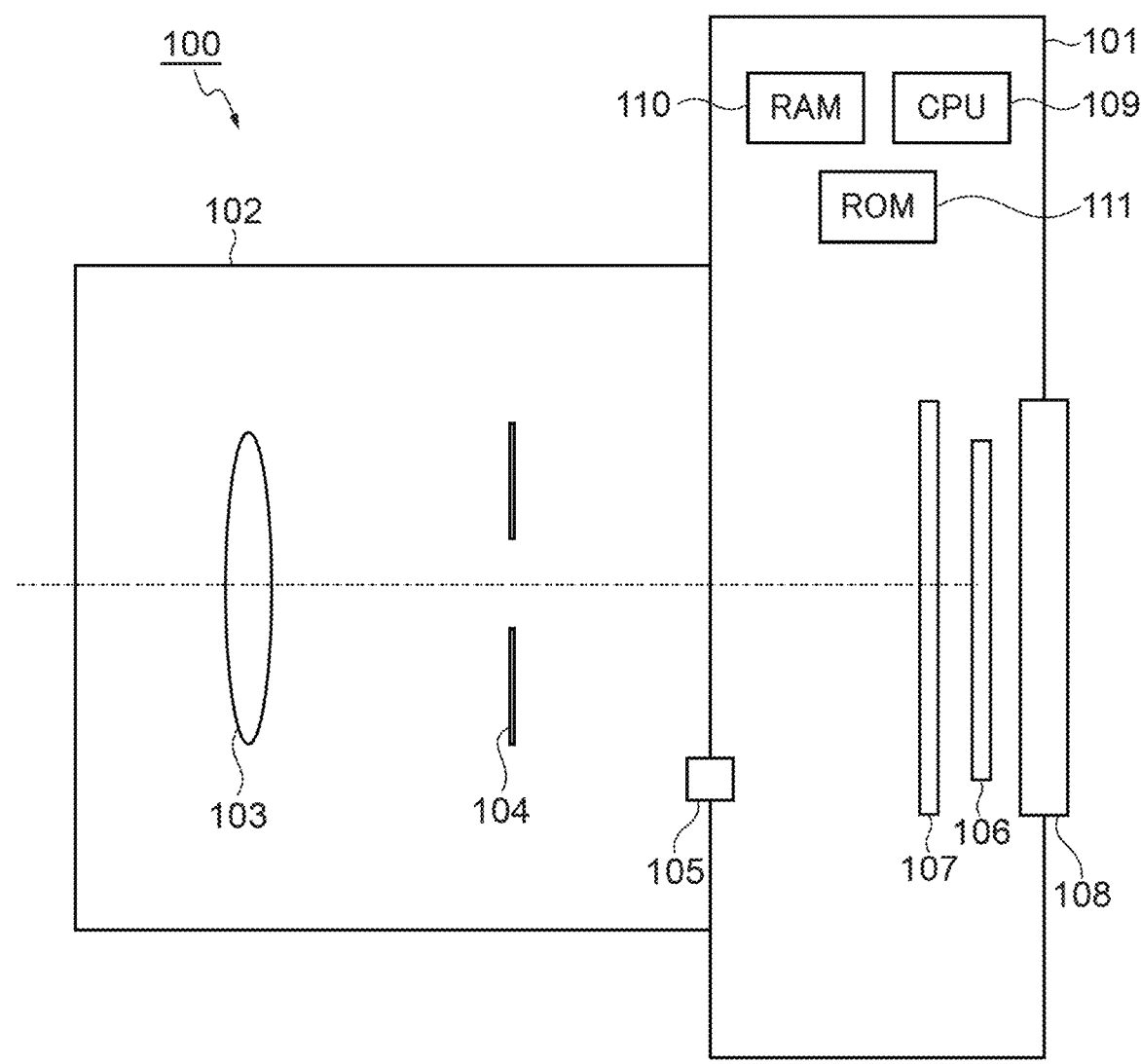
FIG. 1 is a diagram showing an exemplary configuration of an image pickup apparatus according to an embodiment.

FIG. 1 is a diagram showing an exemplary configuration of an image pickup apparatus 100 according to an embodiment. For example, a digital camera is applied to the image pickup apparatus 100. The image pickup apparatus 100 includes a main body 101 and an image pickup lens 102. The main body 101 and the image pickup lens 102 are mechanically and electrically connected to each other. The image pickup lens 102 includes a focusing lens 103 and a diaphragm 104. The image pickup lens 102 is controlled by the main body 101 via a lens mount contact group 105. The main body 101 includes an image pickup device 106, a focal plane shutter 107, a monitor 108, a CPU 109, a RAM 110, and a ROM 111. The image pickup device 106 is a CMOS image sensor, a CCD image sensor, or the like. In the image pickup device 106, a plurality of pixels having photoelectric conversion elements are arranged.

In the case of picking up by the image pickup apparatus 100, control to open the focal plane shutter 107 is performed. Thereby, the image pickup device 106 is exposed, and a subject image is formed. The image pickup device 106 as an image pickup unit converts light incident through the image pickup lens 102 into an electric signal in each pixel during exposure to form image data, and outputs the formed image data to the CPU 109. The image pickup device (sensor) 106 of the embodiment is driven by a global shutter method or a rolling shutter method. The global shutter method is a method in which the charges of all the pixels accumulated in the image pickup device 106 are transferred simultaneously. In the global shutter method, the exposure period from the charge reset to the charge transfer is the same for all the pixels of the image pickup device 106.

The rolling shutter method is a method of sequentially transferring the charges accumulated in the image pickup device 106 for each selected line (scanning line). FIG. 2 is a diagram showing charge transfer by a rolling shutter method. As shown in FIG. 2, in the rolling shutter method, the charge reset to the charge transfer and readout are performed sequentially for each selected line. Then, the charges accumulated by scanning as indicated by the broken arrows are sequentially transferred for each selected line, so that the exposure timing is different for each line. Therefore, when the brightness of a subject is changed due to the influence of flicker or the like, image data having different brightness for each line may be obtained.

The CPU 109 is a controller (computer) that performs various controls according to the embodiment. Further, the CPU 109 performs a predetermined image process on the image data output from the image pickup device 106, and performs control to display the image processed image data on the monitor 108. For example, the various controls of the embodiment may be realized in such a manner that the program stored in the ROM 111 is expanded in the RAM 110 and the CPU 109 executes the program stored in the RAM 111.

Next, a flicker detection process will be described. FIG. 3 are diagrams showing the relationship between sensor driving and flicker for acquiring an image for flicker detection in accordance with the luminance of the subject. In the following, the flicker is a periodic light amount change, and a light source which may cause flicker (light source in which the light amount changes periodically) is referred to as a flicker light source. Further, the flicker detection is detection of the occurrence of flicker, the flicker frequency (period), and the timing when the light amount becomes a predetermined light amount (peak or bottom (maximum value or minimum value)). For example, in the case of a general fluorescent tube, the flicker frequency is 100 Hz or 120 Hz because the flicker frequency is twice the frequency of the power source used for lighting. The flicker frequency is not limited to these values. FIG. 3A is a diagram showing sensor driving and flicker when the luminance of the subject is not low. It should be noted that whether the luminance of the subject is low may be determined based on whether the luminance of the subject is higher than a predetermined value. For example, any configuration may be adopted that the luminance of the subject is calculated based on the image signal obtained in advance by the exposure period corresponding to one cycle of the light amount change of the flicker, and the CPU 109 determines whether the luminance of the subject is low based on the calculated luminance. Therefore, FIG. 3A shows an example where the luminance of the subject is higher than a predetermined value.

In the case of the setting example of FIG. 3A, accumulation and readout of image data are successively performed for a plurality of frames (for a first frame) at a first frame rate. The example of FIG. 3A represents an example in which the first frame rate is "600 fps" and image data is successively acquired for twelve frames. The first frame rate is a frame rate that can ensure charge accumulation time for flicker detection. It should be noted that the first frame rate is not limited to "600 fps", and may be a common multiple of the frequencies of a plurality of flickers that are expected to occur. In the example of FIG. 3A, the accumulation time is "1.66 ms" at maximum. When picking up is performed repeatedly by the rolling shutter method, the CPU 109 successively acquires image data. The CPU 109 obtains an integral value of luminance of the entire surface for each acquired image data, and calculates a flicker cycle and a flicker peak timing from the transition of the integral value obtained for each image data.

FIG. 3B and FIG. 3C are diagrams showing sensor driving and flicker when the luminance of the subject is low. When the luminance of the subject is low, the CPU 109 sets the frame rate to a second frame rate lower than the first frame rate. This is to secure an accumulation time for acquiring image data with appropriate brightness at the time of detecting flicker. Therefore, when the frame rate is set to the second frame rate, accumulation and readout of image data are successively performed for a plurality of frames (for the number of the second frames) smaller than the number of the first frames. The second frame rate is set to, for example, a frame rate obtained by dividing the first frame rate by an integer value of two or more. FIGS. 3B and 3C show an example in which the second frame rate is set to "300 fps". That is, the second frame rate is set to a half frame rate of the first frame rate. In this case, the accumulation time is "3.33 ms" at maximum. Further, image data for six frames, which are half the number of the first frames (12 frames), is successively acquired.

As in the example of FIG. 3A, in order to obtain image data at a high frame rate (first frame rate), high-precision image data can be stored in a short time by decimating image data readout lines or the like. On the other hand, as shown in FIG. 3B and FIG. 3C, in the case of acquiring image data by lowering the frame rate, high-precision image data can be acquired by reducing the number of decimation lines of readout lines of image data. The accumulation time of the image data is set to a time in which the image for flicker detection can ensure sufficient brightness to detect flicker.

In the case of accumulating and reading out image data at the second frame rate, the number of image data that can be acquired in the same time is smaller than when image data is stored and read out at the first frame rate. When the second frame rate is half the first frame rate, the number of samplings that can be acquired by the CPU 109 is also half. In this case, since the number of samplings is half that of the first frame rate, it is difficult to accurately obtain the flicker waveform as compared to the case of the first frame rate. As a result, the calculation accuracy of the cycle and the peak timing of flicker is reduced.

Therefore, as shown in FIG. 3C, the CPU 109 of the embodiment divides the successively acquired image data into predetermined areas, and performs flicker detection based on the transition of the integral value of each divided area. The CPU 109 divides the image data by an integer value (integer value of two or more) obtained by dividing the first frame rate by the second frame rate. When the first frame rate is "600 fps" and the second frame rate is "300 fps", the divided integer value is "2". In this case, as shown in FIG. 3C, the CPU 109 divides the image data into two. Thereby, each image data is divided into two divided areas. For example, the first image data is divided into divided areas 1-(1) and 1-(2). In the case of the example of FIG. 3C, although the number of image data that can be acquired is smaller than that of the example of FIG. 3A, when the divided area is regarded as one sampling data, the number of samplings is not different in FIGS. 3A and 3C. Therefore, even when the second frame rate is set, it is possible to derive a flicker waveform with high accuracy equivalent to the first frame rate. It should be noted that the details of the division method of the image data obtained at the second frame rate will be described later.

Figure 4:
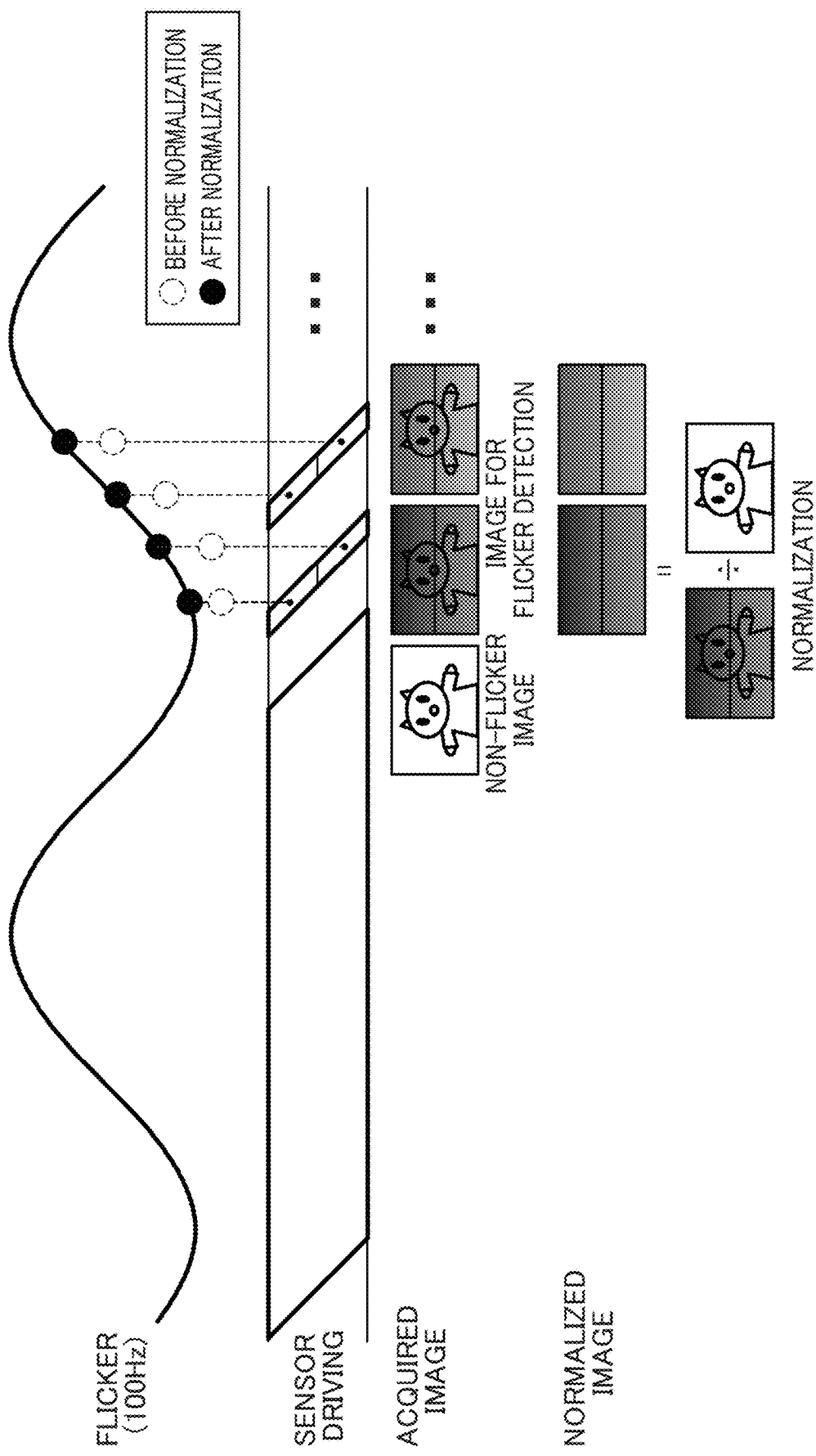
FIG. 4 is a diagram showing an example in which successive images for flicker detection are normalized.

Here, within the plane of each acquired image data, the luminance of the subject is different due to the influence of the flicker. Therefore, the integral value calculated by the CPU 109 includes subject changes other than the influence of flicker. Therefore, the CPU 109 normalizes (standardizes) the successive images for flicker detection using an image (predetermined image data) in which the degree of the influence of the flicker is smaller than a predetermined amount. FIG. 4 shows an example in which the CPU 109 normalizes the successive images for flicker detection with the image data (non-flicker image) not affected by the flicker. In this case, the degree of the influence of the flicker on the non-flicker image (comparison image data) is "0". It should be noted that, in the following description, for the sake of explanation, it is assumed that a non-flicker image is image data not affected by flickers, but for example, an image in which the influence of flicker is smaller than a predetermined value may be regarded as a reference image not affected by flicker. The CPU 109 may acquire the non-flicker image by setting the accumulation time at the time of acquiring the image data to a predetermined time. For example, when the CPU 109 previously detects flicker having a frequency of 100 Hz, the CPU 109 sets the accumulation time to "$1/100$ seconds". When the CPU 109 previously detects flicker having a frequency of 120 Hz in advance, the CPU 109 sets the accumulation time to "$1/120$ seconds". The non-flicker image may be acquired immediately before the flicker detection, and image data acquired for photometry of the subject may be used immediately before the flicker detection.

The CPU 109 performs normalization by obtaining the difference between the acquired non-flicker image and each of the successive images acquired for flicker detection. The CPU 109 may perform normalization by obtaining the ratio of each of the successive images acquired for flicker detection to the non-flicker image. In this way, normalization is performed based on the non-flicker image, so that flicker components in the subject can be extracted with high accuracy. Then, the CPU 109 divides the inside of the plane into a plurality of areas for each acquired image data, and obtains an integral value of luminance for each divided area. As described above, the image data is not divided in the example of FIG. 3B. For this reason, even when flicker detection is performed based on the transition of the integral value of each image data, it is difficult to accurately obtain the flicker waveform due to the small number of samplings. Therefore, the cycle determination and the peak timing with regard to the flicker may not be detected with high accuracy. Therefore, as described above, the CPU 109 divides the image for flicker detection into a plurality of areas as illustrated in FIG. 3C in order to obtain the same number of samplings as in the cases other than the case of the low luminance state illustrated in FIG. 3A.

In the case of picking up by the rolling shutter method, as shown in FIG. 2, the charges accumulated in the image pickup device 106 are sequentially transferred for each selected line, and the accumulation timing is different for each line. As a result, the unevenness of the luminance occurs in the plane of the image data under the influence of the temporal change of the flicker. Therefore, in the case of dividing the image data described above, the CPU 109 divides each line (each line shown in FIG. 2) constituting the image data into two or more areas. Thereby, two or more divided areas can be obtained for one image data. In the example of FIG. 3C, since each image data is divided into two areas, the number of divided areas (1-(1), 1-(2), . . . , 6-(1), 6-(2)) is twelve in total. It should be noted that the number of divisions of the image data is set based on the ratio of the second frame rate to the first frame rate (600 fps).

For example, when the second frame rate is 200 fps, one image data is divided into three divided areas, and flicker detection is performed using a total of twelve successive divided pieces of image data. Further, when the second frame rate is 120 fps, one image data is divided into five divided areas, and flicker detection is performed using a total of twelve successive divided pieces of image data.

Here, as described above, the timings of the divided areas acquired by the CPU 109 are in the order of "1-(1), 1-(2), . . . , 6-(1), 6-(2)". This is because in the rolling shutter method, the timing of each line read out from the image pickup device 106 is different. That is, the CPU 109 first acquires the divided area 1-(1), and then acquires the divided area 1-(2). Then, the CPU 109 sequentially acquires the divided area 2-(1) to the divided area 6-(2). Thereby, even when the frame rate is the second frame rate (half of the first frame rate), it is possible to obtain the same number of samplings as in the case of acquiring double successive images as shown in FIG. 4A. Therefore, even when shooting at the second frame rate because of the low luminance is performed, the CPU 109 can recognize the transition of the luminance change (temporal change) as in the first frame rate.

Figure 5:
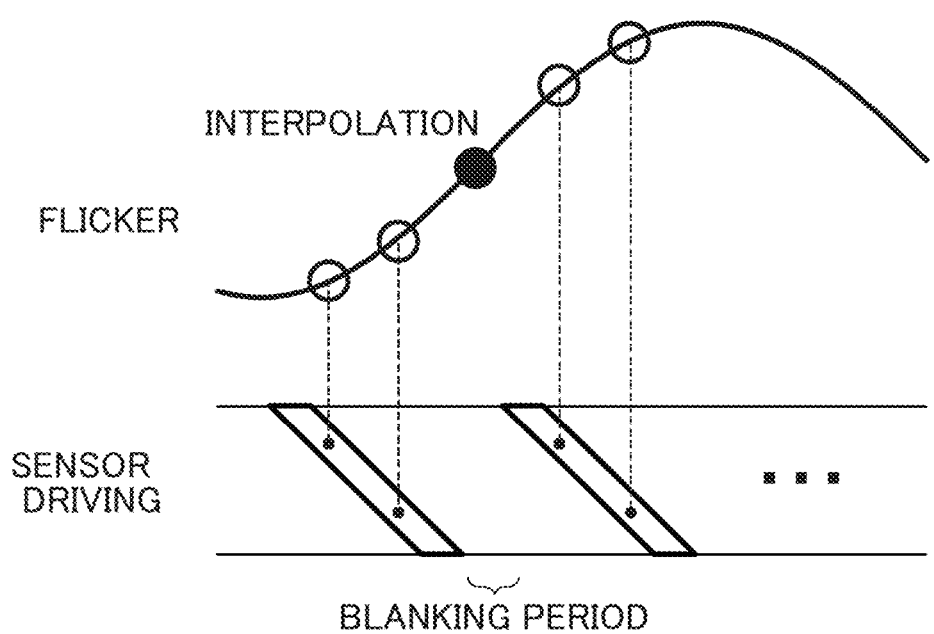
FIG. 5 is a diagram showing an example of interpolation when a blanking period occurs.

Here, depending on the frame rate and the accumulation time set at the time of acquiring image data, a blanking period may occur, which is a period during which exposure is not performed until the next picking up. FIG. 5 is a diagram showing an example of interpolation when a blanking period occurs. The blanking period is a period during which exposure is not performed until the next picking up due to various influences such as sensor driving. That is, the blanking period is a period in which sampling of the flicker waveform is not performed. Therefore, the CPU 109 interpolates sampling data in the blanking period. For example, the CPU 109 may perform interpolation by creating approximate data of the blanking period from the integral value of the area (divided area) before and after the blanking period. Further, the CPU 109 may take an addition average of pieces of data of two divided areas before and after the blanking period. The CPU 109 can obtain a flicker waveform based on the transition of the interpolated integral value, and can determine the flicker cycle. Further, the CPU 109 calculates the flicker peak timing from the integral value obtained for each divided area. That is, picking up is performed by the rolling shutter method, and the flicker waveform is obtained based on the transition of the integral value for each divided area. Thus, it is possible to calculate the cycle and the peak timing with regard to the flicker.

Figure 6:
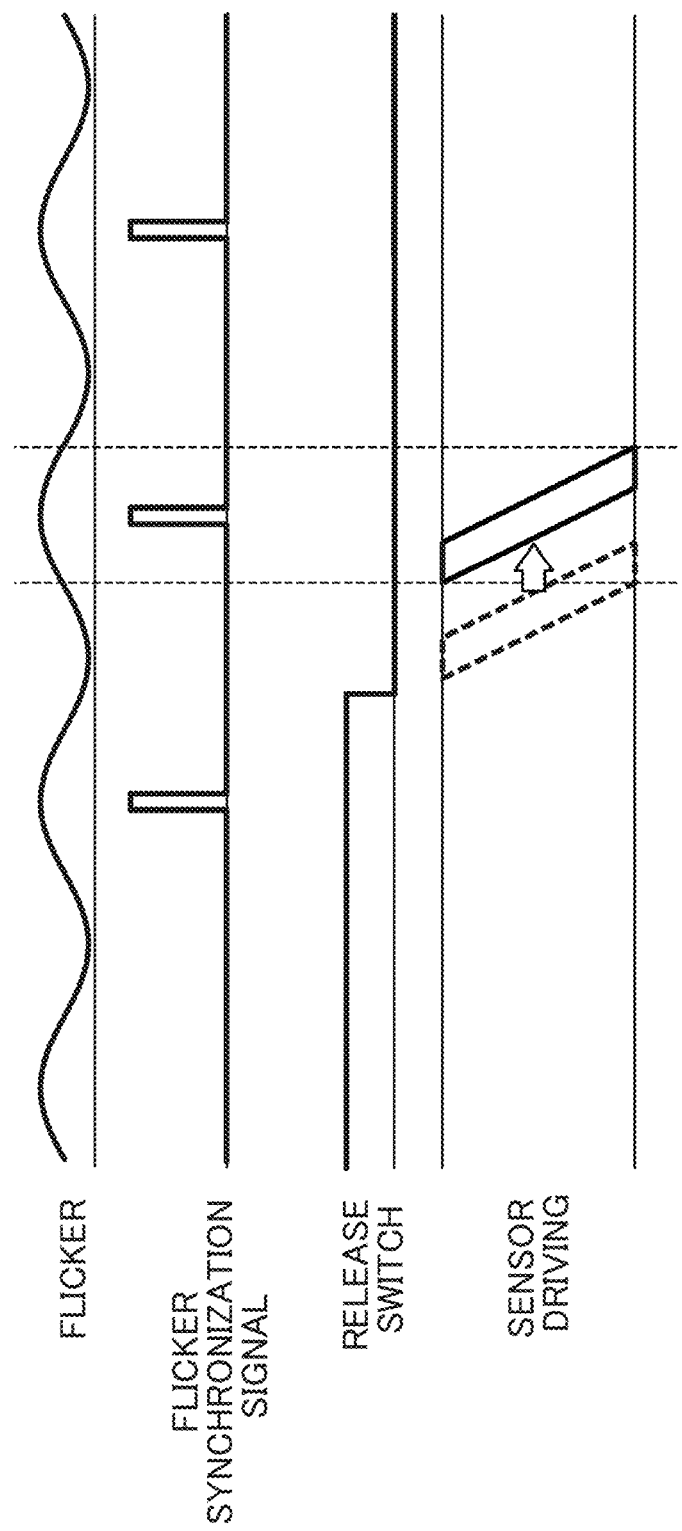
FIG. 6 is a diagram showing the relationship between sensor driving and flicker for performing shooting at a timing at which the influence of flicker is reduced.

Next, with reference to FIG. 6, control regarding flickerless shooting of the image pickup apparatus 100 will be described. FIG. 6 shows the relationship between sensor driving and flicker for performing shooting at a timing at which the influence of flicker is reduced. In FIG. 6, a case where flicker detection is completed before a shooting instruction by pressing a release switch of the image pickup apparatus 100 is performed will be described. When flicker is detected by the flicker detection process, the peak timing of the flicker is detected. In response to the detection of the peak timing of the flicker, a signal for synchronizing the peak of the flicker and the shooting timing (hereinafter referred to as a flicker synchronization signal) continues to be output. When a shooting instruction is issued by pressing a release switch while the flicker synchronization signal is being output, exposure is performed not immediately after the shooting instruction, but by sensor driving in accordance with the output of the flicker synchronization signal. Thus, exposure can be performed in synchronization with the peak timing of the flicker each time shooting is performed, and fluctuations in exposure can be suppressed. In other words, flicker-less shooting that is not affected by flicker can be realized. In the example described above, the case where the flicker is detected before the release switch is pressed is described, but the same applies to the case where the flicker detection process is performed after the release switch is pressed. In this case, after the flicker is detected, a flicker synchronization signal is output to control the sensor and the exposure in accordance with the flicker synchronization signal.

Next, the flow of the process of the present embodiment will be described with reference to the flowchart of FIG. 7. The flowchart in FIG. 7 shows the flow of the process from photometry of a subject to flicker-less shooting by the image pickup apparatus 100. The CPU 109 performs accumulation control and readout control of image data for performing photometry of a subject (S301). Then, the CPU 109 acquires a photometric value (luminance) of the read-out image data (S302). The CPU 109 determines whether a shooting instruction is received (S303). If it is determined NO in S303, the flow returns to S301. If it is determined YES in S303, the CPU 109 determines whether the photometric value (luminance of the image data) exceeds a threshold value (S304). The threshold value is set, for example, to a limit luminance that enables an image for flicker detection to be acquired with sufficient brightness for flicker detection.

If it is determined YES in S304, the luminance of the image data is higher than the threshold value, and thus the luminance is not low. In this case, the CPU 109 sets an accumulation parameter for acquiring image data to be used for flicker detection. If it is determined YES in S304, the CPU 109 sets, as the accumulation parameter, a first frame rate when the subject luminance is other than low luminance (S305). The CPU 109 performs accumulation control and readout control of the image data successively for the first frame (S306). The CPU 109 integrates the entire plane of each of the successively acquired pieces of the image data to calculate an integral value (S307). The CPU 109 performs, based on the transition (temporal change) of the integral value obtained in S307, the flicker detection process (first flicker detection process) based on FIG. 3A (S308).

On the other hand, if it is determined NO in S304, the luminance of the image data is equal to or lower than the threshold value, and the luminance is low. The CPU 109 sets, as the accumulation parameter, the second frame rate lower than the first frame rate (S309). In the example described above, the second frame rate is a frame rate obtained by dividing the first frame rate by an integer value of two or more. The CPU 109 performs accumulation control and readout control of image data successively for the second frame (S310). The CPU 109 normalizes each of the successively acquired pieces of the image data (successive images) with a non-flicker image (S311). The image data acquired in S301 may be used for the non-flicker image, or image data acquired separately before flicker detection may be used for the non-flicker image. The CPU 109 divides each of the images for flicker detection after normalization into a plurality of areas, and calculates an integral value for each divided area (S312). The number of areas to be divided depends on the set second frame rate.

The above-mentioned blanking period may occur depending on the second frame rate set in S309 or the accumulation time of S310. When the blanking period occurs, the CPU 109 interpolates sampling data of the blanking period (S313). When no blanking period occurs, the process of S313 may not be performed. After performing data interpolation in the blanking period, the CPU 109 performs the flicker detection process in view of the change in the integral value for each divided area successive in the time direction (S314). The flicker detection process of S314 is a flicker detection process (second flicker detection process) based on FIG. 3C.

After the flicker detection process (first flicker detection process) of S308 or the flicker detection process (second flicker detection process) of S314 is performed, the CPU 109 determines whether flicker is detected (S315). If it is determined YES in S315, since flicker is detected, the CPU 109 performs control to perform flicker-less shooting based on the peak timing of the flicker (S316). If it is determined YES in S315, since the flicker is not detected, the CPU 109 performs control to perform normal shooting instead of flicker-less shooting (S317).

Next, with reference to FIG. 8, sensor driving for flicker detection before and after the main shooting in the flicker-less shooting when the sensor is driven by the global shutter method will be described. FIG. 8 is a diagram showing sensor driving before and after main shooting when shooting is performed for flicker detection by driving the sensor by the global shutter method. The successive images for performing flicker detection are acquired by shooting by rolling shutter drive. Therefore, in the case of performing shooting by the global shutter drive, it is necessary to switch the sensor driving in accordance with a shooting instruction by pressing the release switch of the image pickup apparatus 100. The image pickup apparatus 100 picks up an image in accordance with the flicker synchronization signal based on the result of flicker detection. When the shooting instruction continues, the image pickup apparatus 100 continues the shooting process in accordance with the flicker synchronization signal. When the pressing of the release switch of the image pickup apparatus 100 is canceled and the shooting instruction is not present, the CPU 109 controls to perform rolling shutter drive as sensor driving for flicker detection again.

As described above, in the embodiment, the CPU 109 changes the frame rate at which the image data is acquired in accordance with the luminance of the subject. Then, when the luminance of the subject is low, the CPU 109 controls to divide the image for flicker detection and perform flicker detection based on the transition of the integration value for each divided area. As a result, the number of samplings for flicker detection can be secured, and a flicker waveform including the peak timing can be acquired with high accuracy. Then, it is possible to suppress the decrease in the flicker detection accuracy due to the luminance of the subject and perform flicker-less shooting.

In the above, the image pickup apparatus 100 performs the shooting process after performing flicker detection in accordance with the shooting instruction, but may perform flicker detection periodically regardless of the timing of the shooting instruction and perform shooting using the result of the flicker detection immediately before the shooting instruction is issued. Further, in the above-described example, when the frame rate is set to the first frame rate, the CPU 109 may perform flicker detection based on temporal change (change with time) of the integral value of the data of a partial area in the plane of the acquired image for flicker detection. As a result, it is possible to detect flicker partially caused in the subject, and flicker-less shooting can be performed based on the detection result of the partially caused flicker.

Further, when the luminance of the subject is lower than the above-described low luminance, for example, a frame rate that is lower than the second frame rate may be set in order to secure an accumulation time for acquiring image data with appropriate brightness. In the case where the image pickup apparatus 100 performs live view display (LV display) on the monitor 108, when flicker detection is simultaneously performed, the frame rate is set to a frame rate lower than that for performing live view display. In such a case, the CPU 109 may perform flicker detection not based on the change in the integral value of the successive pieces of the image data, but based on the change in the luminance in the time axis direction in the plane of the acquired image data.

In addition, the CPU 109 may calculate flicker waveforms with a small number of samplings for each divided area from the change in the integrated value in the time direction for each divided area of the successive images, and synthesize the flicker waveforms. Thereby, it is possible to acquire a flicker waveform having a certain number of samplings. In this case, since the above-described flicker waveforms for the same divided area are synthesized, the effects of subject components other than the flicker need not be considered, and normalization is not necessary. As a result, there is no need to separately acquire a non-flicker image for normalization, and the process of performing normalization can be omitted. Further, the CPU 109 may determine which of the first frame rate and the second frame rate to be set in accordance with the accumulation time, not whether the photometric value of the subject is equal to or larger than the threshold value. For example, when an accumulation time of a long time such as a night scene shooting mode is set to the image pickup apparatus 100, the frame rate may be set in accordance with the set accumulation time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-205620, filed Oct. 31, 2018, which is hereby incorporated by reference herein in its entirety.

What is claimed is:

1. An image pickup apparatus comprising:
an image pickup device that picks up a subject by driving by a rolling shutter method;
a memory that stores instructions; and
at least one processor that executes the instructions to:
perform a first flicker detection, in a state where the image pickup device is driven at a first frame rate, using a plurality of pieces of image data successively acquired by the image pickup device at the first frame rate; and
in a state where the image pickup device is driven at a second frame rate lower than the first frame rate:
divide a plurality pieces of image data successively acquired by the image pickup device at the second frame rate into predetermined areas to acquire data of divided areas; and
perform a second flicker detection using a predetermined number of pieces of the data of the divided areas successive for a plurality of frames.

2. The image pickup apparatus of claim 1, wherein:
the first flicker detection is performed when luminance of image data, which is acquired for photometry of the subject, is higher than a threshold value, and
the second flicker detection is performed when the luminance is equal to or lower than the threshold value.

3. The image pickup apparatus of claim 2, wherein:
the first flicker detection is performed based on change with time of a value obtained by integrating the luminance of the plurality of pieces of image data, and
the second flicker detection is performed based on change with time of a value obtained by integrating the luminance of the data of the divided areas.

4. The image pickup apparatus of claim 1, wherein:
the second frame rate is obtained by dividing the first frame rate by an integer value of two or more, and
the processor executes the instructions to divide each of the plurality of pieces of image data by the integer value.

5. The image pickup apparatus of claim 1, wherein the second flicker detection is performed based on predetermined image data whose degree of flicker influence is smaller than a predetermined amount and each of the data of the divided areas.

6. The image pickup apparatus of claim 5, wherein the second flicker detection is performed by obtaining a difference or a ratio between the predetermined image data and each of the data of the divided areas.

7. The image pickup apparatus of claim 1, wherein the processor executes the instructions to perform interpolation, in a state where a blanking period occurs at a time of performing successive shooting, using the data of the divided areas before and after the blanking period.

8. The image pickup apparatus of claim 1, wherein the first flicker detection is performed based on change with time of an integrated value of luminance of data of a partial area of a plurality of pieces of image data successively acquired by the image pickup device.

9. The image pickup apparatus of claim 1, wherein the processor executes the instructions to set, when live view display is performed, a frame rate lower than a frame rate for performing live view display, and perform third flicker detection based on change in luminance of successive images acquired in accordance with the set frame rate.

10. The image pickup apparatus of claim 1, wherein the processor executes the instructions to calculate a flicker waveform based on change with time of a value obtained by integrating luminance for each data of the divided areas, and synthesize a flicker waveform of each calculated data of the divided areas.

11. The image pickup apparatus according to claim 1, wherein a number of divisions of each of the plurality of pieces of image data for obtaining the data of the divided areas is set in accordance with a ratio of the second frame rate to the first frame rate.

12. A control method for an image pickup apparatus including an image pickup device that picks up a subject by driving by a rolling shutter method, the control method comprising:

performing a first flicker detection, in a state where the image pickup device is driven at a first frame rate, using a plurality of pieces of image data successively acquired by the image pickup device at the first frame rate; and in a state where the image pickup device is driven at a second frame rate lower than the first frame rate:

diving a plurality pieces of image data successively acquired by the image pickup device at the second frame rate into predetermined areas to acquire data of divided areas; and performing a second flicker detection using a predetermined number of pieces of the data of the divided areas successive for a plurality of frames.

13. A non-transitory computer-readable storage medium storing a computer-executable program executable by a computer to execute a control method for an image pickup apparatus including an image pickup device that picks up a subject by driving by a rolling shutter method, the control method comprising:

performing a first flicker detection, in a state where the image pickup device is driven at a first frame rate, using a plurality of pieces of image data successively acquired by the image pickup device at the first frame rate; and in a state where the image pickup device is driven at a second frame rate lower than the first frame rate:

diving a plurality pieces of image data successively acquired by the image pickup device at the second frame rate into predetermined areas to acquire data of divided areas; and performing a second flicker detection using a predetermined number of pieces of the data of the divided areas successive for a plurality of frames.

* * * * *